2,769,755

HYDRODESULFURIZING PETROLEUM WITH DE-SULPHURISATION CATALYSTS ON CALCINED TRIHYDRATE BAUXITE

Frederick William Bertram Porter and John Norman Haresnape, Sunbury-on-Thames, England, assignors to The British Petroleum Company Limited No Drawing. Application February 20, 1952, Serial No. 272,702

Claims priority, application Great Britain February 23, 1951

2 Claims. (Cl. 196—28)

This invention relates to catalysts for use in the desulphurisation of impure hydrocarbon materials such as petroleum fractions by processes in which the sulphur compounds present with the hydrocarbons are converted to hydrogen sulphide by passage over a catalyst in the presence of hydrogen. Prominent among catalysts for this purpose are those containing cobalt and molybdenum, often in the form of cobalt molybdate, but frequently with an excess of cobalt oxide or (more usually) of molybdenum oxide. The present invention is concerned with catalysts of this type. Such catalysts are commonly employed with the cobalt and molybdenum compounds dispersed upon a porous carrier such as activated bauxite or alumina and the carrier, in addition to increasing the activity of a given amount of cobalt and molybdenum by increasing the surface over which it is spread, may make an essential contribution to the nature of the catalyst activity. For example, when the carrier is bauxite or alumina it may, in combination with the cobalt and/or molybdenum, promote the dehydrogenation of naphthene hydrocarbons in the material being desulphurised, the hydrogen so formed being of benefit in the desulphurisation reaction.

In general, when the amounts of cobalt and molybdenum are small the activity of the catalyst increases as the content of molybdenum and/or cobalt is increased, but as the total amount of cobalt and molybdenum incorporated rises further, the increased activity for successive additions becomes less and less until above a certain point the activity may become constant or may even decrease with increase in cobalt and/or molybdenum content.

Thus we have found that when activated alumina is the base the activity does not increase with the cobalt content of the catalyst where the cobalt, expressed as CoO, is present in excess of about 3% of the catalyst whilst it continues to increase with the molybdenum content, expressed as MoO₃, as this rises to about 15% of the catalyst and then remains little changed as the molybdenum content (as MoO₃) is increased to about 25%. Since molybdenum and cobalt are relatively expensive materials it is usually most advantageous to choose the cobalt and molybdenum contents rather below those giving the optimum activity since extra activity above this point is only obtained at the cost of a considerable outlay for extra cobalt and molybdenum.

We have found also that with alumina of a given quality, and cobalt (expressed as CoO) and molybdenum (as MoO₃) contents which, taken together, do not exceed about 18%, the activity for any particular cobalt and molybdenum contents is but little dependent on the method of incorporating the cobalt and molybdenum with alumina, provided that they are thoroughly dispersed. For example, whether the cobalt and molybdenum are co-precipitated with the alumina from solution, or added as solutions to wet alumina gel which is then dried, or impregnated from solution on to dried and roasted activated alumina, the resultant catalyst after drying and roasting (say to 550° C.) has virtually the same activity. Above about 18% content of cobalt and molybdenum (expressed as CoO and MoO₃ respectively) it becomes difficult to prepare catalysts by the impregnation method and co-precipitation methods must be employed, but as has been stated, there is little further increase in activity up to 25% MoO₃ content.

We have now found that when the carrier is a bauxite instead of a pure alumina, important differences appear in the dependence of activity on cobalt and molybdenum content. In this case, of course, co-precipitated and similar catalysts are precluded and attention is confined to those prepared by impregnation. Among these we have found that for low cobalt and molybdenum contents the activity of a catalyst on a certain type of bauxite carrier is higher than that on an activated alumina carrier, the two catalysts having equal cobalt and molybdenum contents. As the molybdenum content is increased, the activity when using the bauxite carrier at first rises and then falls so that one particular catalyst containing about 14% MoO₃ was found to be actually less active than one containing only about 7% MoO₃ on the same bauxite carrier. Moreover, the last mentioned catalyst was found to be superior in activity to any of the catalysts on activated alumina base mentioned above, being rather more active than that containing the equivalent of about 25% MoO₃ and definitely superior to that containing about 11% MoO₃.

Bauxite is, of course, well known as a catalyst support and if all bauxites were as effective as alumina in this respect there would always be an advantage in using bauxite since it is considerably cheaper than alumina. Certain bauxites however are less effective than alumina as catalyst supports, in particular for catalysts of the kind here in question. It has been suggested in United States patent specification No. 2,487,466 that a cobalt and molybdenum oxide catalyst based on a support consisting of bauxite having more than about 5% of alumina distended thereon is more effective than a similarly constituted catalyst based on alumina alone, while of course the cost of the catalyst is less having regard to the large bauxite content. Figures quoted in support of this discovery show that the bauxite by itself is less effective as a catalyst base than alumina and it is believed that this is probably due to the fact that the particular bauxite used as the sole support was not of the kind we have now shown to be more effective than alumina. In any event, it has now been discovered that by using a suitable bauxite, a catalyst of the kind comprising the oxides of cobalt and molybdenum can be produced having a similar or enhanced activity compared with those based on alumina but having a greatly reduced cobalt and molybdenum content. Catalysts prepared according to the present invention are therefore less costly than alumina-based catalysts, both on account of the relative cheapness of the bauxite and on account of the saving in metal costs.

The bauxites which we have found to be more effective for the purposes of the present invention are those trihydrate bauxites, having the general formula (excluding impurities) Al₂O₃.3H₂O, which after dehydration by roasting for two hours at about 550° C. have a surface area greater than 120–125 sq. m./g. as measured by the well-known nitrogen adsorption method of Brunauer, Emmett and Teller. Monohydrate bauxites having the general formula Al₂O₃.H₂O have been found to be ineffective as carriers.

According to the invention therefore, a catalyst for use in the desulphurisation of hydrocarbons, consists of a mixture of the oxides of cobalt and molybdenum, or a chemical compound of cobalt, molybdenum and oxygen, or a mixture of one or both of said oxides with said compound, dispersed on a trihydrate bauxite which has been heated for at least two hours at about 550° C. and which after heating has a surface area greater than 120–125 sq. m./g. as measured by the nitrogen adsorption method of Brunauer, Emmett and Teller.

The cobalt and molybdenum are conveniently incorporated with the activated bauxite by impregnation from solution on to the bauxite which is then dried and roasted to about 550° C.

Although the catalysts on bauxite bases are some 20% greater in density than those on alumina bases, so that a given volume of a bauxite-based catalyst contains 20% more molybdenum than an equal volume of one of similar molybdenum content but on an alumina base, this factor is insufficient to outweigh the large advantage in activity possessed by the bauxite-based catalysts.

The optimum contents of cobalt and molybdenum and the optimum ratio of cobalt and molybdenum vary with different bauxites, but in general the molybdenum content should lie within 1–15% by weight $MoO_3$ and preferably within 5–12% by weight $MoO_3$, while the cobalt content should lie between 0.2 and 3% by weight CoO, preferably between 1–2½% by weight CoO. Within these limits the ratio of cobalt to molybdenum may be varied as desired but a preferred ratio is 1:5 by weight as oxides.

The optimum content of cobalt expressed as CoO on an alumina base is around 2% by weight on the catalyst. At this level of cobalt content the activity of a bauxite-based catalyst is superior to that of an alumina-based catalyst when the molybdenum content expressed as $MoO_3$ is less than about 10% by weight. The same generalisation holds true if catalysts on the two bases are compared which have similar weights of cobalt and molybdenum per unit volume of the catalyst. In the optimum range of molybdenum content for the bauxite-based catalysts, activities are reached which are fully equal to those of the most active alumina-based catalysts which contain considerably greater quantities of molybdenum. Thus, by using a selected bauxite as the catalyst base and carefully choosing the molybdenum content, it is possible to attain an activity equal to, or greater than, that of any alumina-based catalyst investigated, at a greatly reduced cost on account of (a) less molybdenum being required and (b) bauxite being a cheaper material than activated alumina.

The greater effectiveness of the trihydrate bauxite as compared with monohydrate bauxite may be connected with the greater amount of free space and the greater intrinsic surface developed on expelling the greater quantity of water, but it is to be understood that the invention is in no way limited by such explanation. Five trihydrate bauxites (two from the Gold Coast and one each from India and British Guiana and the Far East) were tested as carriers with about 7% $MoO_3$ and 2% CoO and all were found to be more effective than an alumina-based catalyst containing 11% $MoO_3$ and 2.3% CoO. Three monohydrate bauxites (two of French and one of Dutch origin) all proved ineffective as carriers.

We do not suggest that the increased activity of catalysts based on trihydrate bauxites having the stipulated surface area is necessarily or solely due to the surface area characteristic. Thus, the alumina forming the base of catalysts having less activity than those according to the present invention has a much greater surface area than the bauxites which yield improved catalysts. However, our investigations have indicated that if a bauxite is to yield a catalyst of activity greater than one of similar cobalt and molybdenum content, but on alumina base, the contents of CoO and $MoO_3$ being in the optimum range of 1–2½% and 5–12% respectively, it must have a surface area after dehydration greater than about 120–125 m.2/g. as stipulated The following example illustrates the effectiveness of the trihydrate bauxites in more detail.

EXAMPLE 1

Samples of a number of bauxites were dehydrated by roasting at 550° C. for two hours, allowed to cool out of contact with moisture and the loss in weight on roasting determined. A quantity of 200 g. of each dehydrated bauxite was then taken and used as the base for the preparation of a catalyst according to the invention. In each case this was impregnated for 1½ hours at 30° C. with 300 ml. of a solution containing 66 g. of ammonium molybdate $(NH_4)_6 Mo_7O_{24}.4H_2O$ and 56.4 g. of cobalt nitrate $Co(NO_3)_2 6H_2O$ in 127.5 g. of distilled water and 134.2 g. of ammonia solution (0.88 S. G.), filtered off, dried for 64 hours at 150° C. and finally roasted for two hours at 550° C. The activities of the finished catalysts were compared for the desulphurisation of a gas oil feedstock over a period of two hours duration at a total pressure of 50 p. s. i. ga. and a temperature of 760° F. in the presence of hydrogen added at a rate equivalent to 150 cu. ft. per barrel of gas oil. The results obtained are compared in the following table, the activities being expressed as a percentage of that of a catalyst for which an arbitrary value of 100 is assumed:

| Place of origin of bauxite | Loss in weight on dehydration (percent) | Type of bauxite | Analysis of catalyst | | Surface area after dehydration | Desulphurising activity |
|---|---|---|---|---|---|---|
| | | | CoO | $MoO_3$ | | |
| Holland | 14.0 | Monohydrate | 1.45 | 6.6 | | 38 |
| France | 12.0 | do | 1.1 | 4.15 | | 25 |
| Do | 16.2 | do | 1.0 | 4.6 | | 34 |
| British Guiana | 30.8 | Trihydrate | 2.4 | 9.1 | 125 | 100 |
| Gold Coast | 30.4 | do | 2.25 | 10.1 | 172 | 106 |
| Far East | 30.0 | do | 1.85 | 8.1 | 134 | 92 |
| Gold Coast | 31.0 | do | 2.3 | 8.4 | 157 | 96 |
| India | 31.0 | do | 2.0 | 8.5 | 141 | 100 |
| Do | | do | 1.44 | 7.2 | 117 | 70 |

The activities of alumina-based catalysts expressed with relation to the same arbitrary value of 100 are set out below.

| Analysis of catalyst | | Desulphurising activity |
|---|---|---|
| CoO | $MoO_3$ | |
| 1.6 | 4.4 | 70 |
| 2.2 | 7.8 | 85 |

The invention also comprises an improved process for the desulphurisation of petroleum hydrocarbons. Thus, catalysts prepared according to the present invention may be used in the well-known hydrofining process in which a hydrocarbon feedstock containing sulphur compounds is passed over the catalyst at a temperature usually in the range of 600–900° F. and in the presence of added hydrogen. Catalysts according to the present invention may be used with advantage in the hydrofining of crude petroleum as described in the specification of the co-pending application No. 8,043/51. They are especially effective in the autofining process which is the subject of United States Patents Nos. 2,573,726, 2,574,445, 2,574,448, 2,574,446, 2,574,449, 2,574,447, 2,574,450 and 2,574,451 and in which the catalyst and the conditions are carefully chosen so that dehydrogenation of naphthene hydrocarbons present in the feedstock to aromatic hydrocarbons occurs without deleterious side-reactions, the hydrogen so produced is used to convert sulphur compounds present to hydrogen sulphide without the necessity to supply hydrogen from an extraneous source. As set forth in the foregoing patents, the autofining process employs a temperature in the range of 650–800° F. and a pressure of between about 25–500 p. s. i. g./ga. with the selected temperature and the selected pressure being adjusted or corelated with respect to one another so that a net production of hydrogen is obtained, thereby eliminating the need of hydrogen from an extraneous source. We have found that in this process a catalyst according to the present invention on a bauxite base, and containing only 7% of molybdenum (expressed as $MoO_3$) is superior in activity to one on an activated alumina base containing a similar amount of molybdenum, and equal to one on an activated alumina base containing 25% of molybdenum.

The invention will now be described by way of example with reference to the following additional examples.

EXAMPLE II

A number of catalysts on bauxite and on activated alumina base were prepared by a method of which the following is typical:

330 g. of ammonium molybdate $(NH_4)_6Mo_7O_{24}.4H_2O$ were dissolved in 500 g. of distilled water and 88 g. of 0.88 S. G. ammonia solution. To this solution was added a solution of 282 g. of cobalt nitrate hexahydrate $Co(NO_3)_2.6H_2O$ in 100 g. of distilled water. The resulting precipitate was redissolved by adding 450 g. of 0.88 S. G. ammonia solution. This solution was poured on to 1640 g. of Indian bauxite which had previously been activated by roasting at 550° C. for two hours and allowed to impregnate the bauxite for two hours. After impregnation the bauxite was drained and dried at 150° C. for 16 hours and then roasted for two hours at 550° C. On analysis it proved to have a cobalt content of 2.0% weight (expressed as CoO) and a molybdenum content of 8.5% weight (as $MoO_3$). Greater cobalt and molybdenum contents were attained by repeating the impregnation one or more times and lesser contents by reducing the cobalt and molybdenum concentrations in the impregnating solutions.

A further alumina based catalyst of high molybdenum content was prepared by co-precipitation of cobalt and molybdenum along with the alumina in the manufacture of alumina gel. This was similarly dried and roasted before use.

These catalysts were used to remove sulphur from an Iranian gas oil by the autofining process. The gas oil, of specific gravity 0.8635 at 60° F. contained initially 1.14% of sulphur as organic sulphur compounds and had a boiling range from 493 to 674° F. in an Engler type distillation. The catalyst charge occupied a volume of 520 ml. in each case and was pretreated with hydrogen at 100 p. s. i. ga. and 780° F. prior to use. The gas oil was passed downwards over the catalyst bed at 1040 ml. per hour at a temperature of 780° F. and in presence of hydrogen gas sufficient to bring the total pressure to 100 p. s. i. ga. and hydrogen gas was introduced with the gas oil feed at a rate of 750 litres (measured at N. T. P.) per litre of gas oil, equivalent to 4,000 cubic feet per barrel. After the initial start-up this gas was provided by recycling a portion of the gaseous part of the products leaving the reactor, this gas remaining predominantly hydrogen. The experiment was continued for 50 hours and the results obtained on various catalysts are given below:

operating conditions and the product inspection data are set out in Table I below.

Table I

Operating conditions:
Catalyst charge—
Volume, 1,000 ml.
Weight, 1,167 g.
Number of regenerations—Nil.
Direction of flow—Upwards.

| Run data—Test period No | 1 | 2 | 3 |
|---|---|---|---|
| Hours on stream since regeneration | 10 | 25 | 33 |
| Total life of catalyst, hr | 10 | 25 | 33 |
| Av. catalyst bed temp., ° F | 773 | 780 | 777 |
| Reactor pressure, p. s. i. ga | 1,000 | 1,000 | 1,000 |
| Space velocity, v./v./hr | 1.02 | 1.02 | 1.02 |
| Recycle gas rate, C. F. B | 3,940 | 3,915 | 3,930 |

| Liquid product inspection data: | Feed | | | |
|---|---|---|---|---|
| Percent wt. on feedstock | 100.0 | 97.4 | 98.8 | |
| Specific gravity, 60° F./60° F | 0.8690 | 0.8510 | 0.8505 | 0.8495 |
| Sulphur, percent wt | 2.56 | 0.19 | 0.26 | 0.28 |
| Sulphur removal, percent | | 92.6 | 89.8 | 89.1 |

A chemical analysis of the catalyst used above together with a similar analysis of a cobalt molybdate-on-alumina catalyst, is set out in Table II below.

Table II

| Catalyst | Cobalt and molybdenum oxides on bauxite | Cobalt and molybdenum oxides on alumina |
|---|---|---|
| Loss at 1,020° F | 4.1 | 9.9 |
| Percent wt. on material stable at 1,020° F.: | | |
| $MoO_3$ | 6.75 | 23.5 |
| CoO | 1.9 | 4.66 |
| Mesh size BSS | 8–12 | 4–8 |

The sulphur removal obtained by means of the catalyst according to the present invention is compared with that obtained by means of the cobalt molybdate-on-alumina catalyst in Table III.

Table III

| Sulphur removal, percent | 10 hr. | 25 hr. | 33 hr. |
|---|---|---|---|
| Cobalt and molybdenum oxides/bauxite | 92.6 | 89.8 | 89.1 |
| Cobalt and molybdenum oxides/alumina | 92.5 | 89.0 | 87.5 |

These results show that there is no significant difference in the activity of the two catalysts over the first 30 hours. The catalyst on alumina base was more active than any alumina-base catalyst prepared in a similar way and containing less cobalt and molybdenum and the advantage of the bauxite-based catalyst in attaining a similar activity at less cost for catalyst is thus clear.

We claim:

1. A process for the hydrocatalytic desulphurization of petroleum hydrocarbons under autofining conditions

| Catalyst base | Method of preparation | CoO, Percent wt. | $MoO_3$ Percent wt. | Grams catalyst charged (520 ml.) | Organic sulphur content (Percent wt.) of liquid product at— | | | | |
|---|---|---|---|---|---|---|---|---|---|
| | | | | | 10 hrs. | 20 hrs. | 30 hrs. | 40 hrs. | 50 hrs. |
| Alumina | Impregnation | 2.6 | 7.5 | 436 | 0.50 | | 0.57 | | 0.63 |
| Do | do | 2.2 | 10.9 | 443 | 0.47 | 0.51 | 0.53 | | 0.57 |
| Do | Coprecipitation | 4.9 | 24.6 | 438 | 0.40 | 0.38 | 0.46 | 0.47 | 0.50 |
| Indian bauxite | Impregnation | 1.3 | 5.4 | 544 | 0.53 | | 0.56 | | 0.61 |
| Do | do | 2.0 | 8.5 | 539 | 0.36 | 0.38 | 0.38 | 0.42 | 0.43 |
| Do | do | 2.9 | 14.2 | 551 | 0.50 | 0.54 | 0.56 | 0.57 | 0.58 |

EXAMPLE III

A catalyst prepared in the manner described in Example II was used to hydrofine a Kuwait crude oil. The which comprises passing the hydrocarbon to a reacting zone where it is contacted in the presence of hydrogen and at a temperature within the range of 650–800° F. and at a pressure within the range of 25–500 p. s. i./ga.

with a catalytic agent selected from the class consisting of mixtures of oxides of cobalt and molybdenum and chemical compounds of cobalt molybdenum and oxygen, the molybdenum content of the catalyst expressed as $MoO_3$ being between 1 and 15% by weight, and the cobalt content expressed as CoO being between 0.2 and 3% by weight, dispersed on a trihydrate bauxite which has been heated for at least two hours at a temperature of about 550° C., and which after heating has a surface area greater than 120 sq. m./gm. as measured by the nitrogen adsorption method of Brunauer, Emmett and Teller.

2. A process in accordance with claim 1 wherein the molybdenum content expressed as $MoO_3$ is between 5 and 12% by weight, and the cobalt content expressed as CoO is between 1 and 2.5% by weight.

References Cited in the file of this patent

UNITED STATES PATENTS

| | | |
|---|---|---|
| 2,422,372 | Smith et al. | June 17, 1947 |
| 2,498,559 | Layng et al. | Feb. 21, 1950 |
| 2,499,675 | Owen | Mar. 7, 1950 |
| 2,500,146 | Fleck et al. | Mar. 14, 1950 |
| 2,574,448 | Docksey et al. | Nov. 6, 1951 |
| 2,608,521 | Hoog | Apr. 26, 1952 |